United States Patent
Hume et al.

(10) Patent No.: US 11,358,066 B2
(45) Date of Patent: Jun. 14, 2022

(54) USER INTERACTION MONITORING

(71) Applicant: Sony Interactive Entertainment Inc., Tokyo (JP)

(72) Inventors: Oliver George Hume, London (GB); Stephen Anthony Hack, London (GB); David Erwan Damien Uberti, London (FR)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/288,173

(22) Filed: Feb. 28, 2019

(65) Prior Publication Data

US 2019/0270021 A1 Sep. 5, 2019

(30) Foreign Application Priority Data

Mar. 1, 2018 (GB) ...................................... 1803324

(51) Int. Cl.
*A63F 13/87* (2014.01)
*A63F 13/217* (2014.01)
(Continued)

(52) U.S. Cl.
CPC ............ *A63F 13/87* (2014.09); *A63F 13/217* (2014.09); *A63F 13/67* (2014.09); *A63F 13/75* (2014.09); *A63F 13/79* (2014.09); *G06F 16/9035* (2019.01); *A63F 13/45* (2014.09); *A63F 2300/5586* (2013.01)

(58) Field of Classification Search
CPC ...... G06F 16/9035; A63F 13/45; A63F 13/67; A63F 13/87; A63F 13/75; A63F 13/79; A63F 13/217
See application file for complete search history.

(56) References Cited

U.S. PATENT DOCUMENTS

2003/0216183 A1* 11/2003 Danieli .................. A63F 13/12
463/42
2003/0216962 A1 11/2003 Heller
(Continued)

FOREIGN PATENT DOCUMENTS

WO 2009109042 A1 9/2009

OTHER PUBLICATIONS

Combined Search and Examination Report for corresponding GB Application 18033241, 4 pages, dated Aug. 30, 2018.
(Continued)

*Primary Examiner* — Steve Rowland
(74) *Attorney, Agent, or Firm* — Matthew B. Dernier, Esq.

(57) ABSTRACT

A user interaction monitoring system for monitoring a user's interactions with other users in an online environment includes: an interaction monitoring unit operable to monitor interactions between a first user and at least a first group of other users in the online environment and characterising the monitored interactions, an interaction identifying unit operable to identify whether interactions between the first user and the first group of other users deviate from the interactions between a second user and a second group of other users in the online environment, and a user experience modifying unit operable to modify the user experience in the online environment for the first user if it is identified that there is a deviation in the interactions.

11 Claims, 5 Drawing Sheets

(51) Int. Cl.
  *A63F 13/67* (2014.01)
  *A63F 13/79* (2014.01)
  *G06F 16/9035* (2019.01)
  *A63F 13/75* (2014.01)
  *A63F 13/45* (2014.01)

(56) References Cited

U.S. PATENT DOCUMENTS

| | | | | |
|---|---|---|---|---|
| 2005/0192097 | A1* | 9/2005 | Farnham | A63F 13/795 463/42 |
| 2006/0247055 | A1* | 11/2006 | O'Kelley, II | A63F 13/795 463/42 |
| 2006/0287099 | A1* | 12/2006 | Shaw | H04L 67/14 463/42 |
| 2008/0004107 | A1* | 1/2008 | Nguyen | A63F 13/12 463/29 |
| 2008/0189380 | A1 | 8/2008 | Bosworth | |
| 2009/0113554 | A1* | 4/2009 | Zalewski | G06F 21/50 726/26 |
| 2009/0299925 | A1* | 12/2009 | Ramaswamy | G06F 21/552 706/12 |
| 2010/0184517 | A1* | 7/2010 | Danieli | A63F 13/87 463/42 |
| 2012/0142429 | A1* | 6/2012 | Muller | |
| 2014/0075305 | A1* | 3/2014 | Kaihu | G06Q 30/08 715/706 |
| 2017/0225079 | A1 | 8/2017 | Conti | |

OTHER PUBLICATIONS

Extended European Search Report for corresponding EP Application No. 19155748.7, 9 pages, dated Jul. 23, 2019.
Communication Pursuant to Article 94(3) EPF for corresponding EP Application No. 19155748.7, 5 pages, dated Jun. 1, 2021.

* cited by examiner

USER INTERACTION MONITORING

BACKGROUND OF THE INVENTION

Field of the Invention

This invention relates to a user interaction monitoring system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Online gaming has become increasingly common in recent years, driven at least in part by an increase in available internet speeds so as to enable effective real-time interactions between players. Online gaming is desirable in that it enables a player to test their skills against a far greater number of players (either simultaneously or in turn) than if they were limited to playing people that were physically present to play a multiplayer game on the same device. This can extend the lifetime of a game several times over—rather than being exposed to the same computer-controlled characters regularly the player is able to experience much more variety in in-game interactions by playing with other human players. In addition to this, online gaming can allow players to interact with friends without leaving the comfort of their own home.

However, there are a number of drawbacks associated with online gaming and online interactions in general; one example of this is in the frequency and/or severity of negative interactions between players. The anonymity that is provided to a user in an online environment may cause them to behave in a different manner to that which would be socially acceptable—the lack of possible repercussions can cause players to become more verbally aggressive and/or offensive to other players. Such players are often referred to as 'toxic players', due to their impact on other players' enjoyment of the online gaming experience. Similarly, such behaviour may occur in other online interactions, such as in forums or message boards.

It is common for games to include a large number of players—while 4-8 players is very common, it has become increasingly common to have hundreds of players in a single online environment. A massively multiplayer online role-playing game (MMORPG) is an example of this. In view of this, it is apparent that even a single toxic player can have a negative impact on the enjoyment of a game for a large number of people.

It is also possible that a single player may be the target of abuse from a group in such a multiplayer environment; for example, a team may be comprised of a group of friends and a single other player, in which case it is likely that the other player will come the victim of abuse if the game is not going well. This can discourage players from playing games alone, or even at all, and so it may be considered desirable to assist users in avoiding situations such as this.

It is therefore desirable to be able to limit the ability of toxic players and the like to impact the enjoyment of other users of an online service, and to assist users in avoiding abusive situations resulting from the actions of toxic players.

It may be further desirable to be able to identify those who behave in a more positive manner, and to encourage this.

It is in the context of this problem that the present invention arises.

SUMMARY OF THE INVENTION

Various aspects and features of the present disclosure are defined in the appended claims and within the text of the accompanying description and include at least user interaction monitoring system and method.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

While much of the following description is provided in the context of an online gaming arrangement, it should be understood that the disclosed system and method may be applied to any type of online environment. While an online environment in the below description may comprise one or more game servers, examples of other suitable online environments include message boards and forums, for example, or social networking websites.

Figure 1:
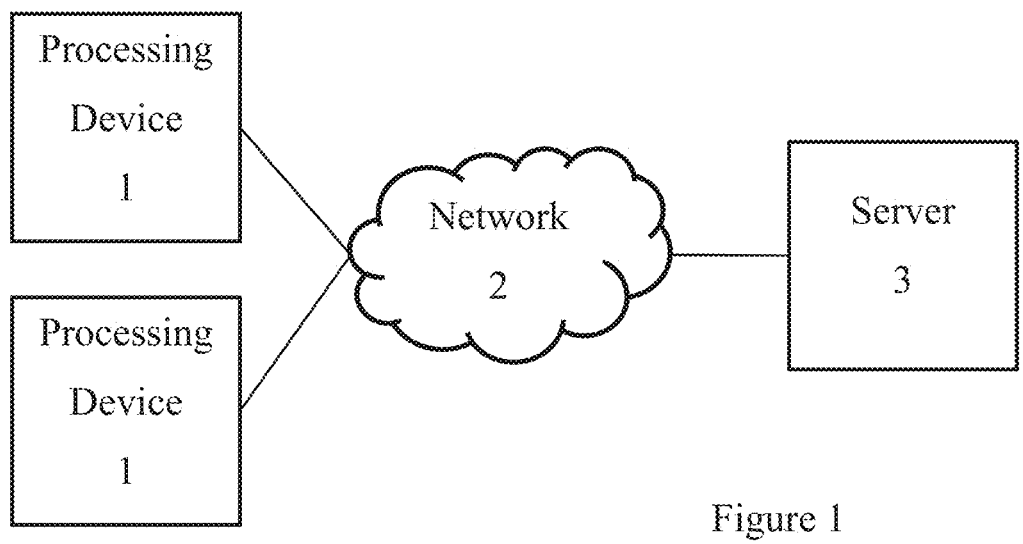
FIG. 1 schematically illustrates a system for providing online interactions.

Referring now to the drawings, wherein like reference numerals designate identical or corresponding parts throughout the several views, FIG. 1 schematically illustrates a network arrangement by which a user is able to participate in online interactions, such as online gaming. This arrangement comprises a number of processing devices 1 (only two devices are shown here, but any number may be provided), a network 2 and a server 3.

In some embodiments, the processing devices 1 may be dedicated games consoles such as the Sony® PlayStation 4®, while in other embodiments a more general computing device such as a PC or mobile phone may be provided. Of course, it is not essential that each of the processing devices 1 are the same type of device. The processing devices 1 may be connected to the network 2 via any suitable wired or wireless connection.

The server 3 is operable to store information that can be accessed by the processing devices 1 via the network 2. For example, the server 2 could be used to host online games that are accessed via an internet connection and perform processing relating to the games that are being played (or indeed, any other processing). Alternatively, or in addition, the server may store other information such as message board posts and user profile information. In some embodiments, the server 3 may comprise one or more game sessions, and further servers may provide one or more additional game sessions within the same online environment.

Figure 2:
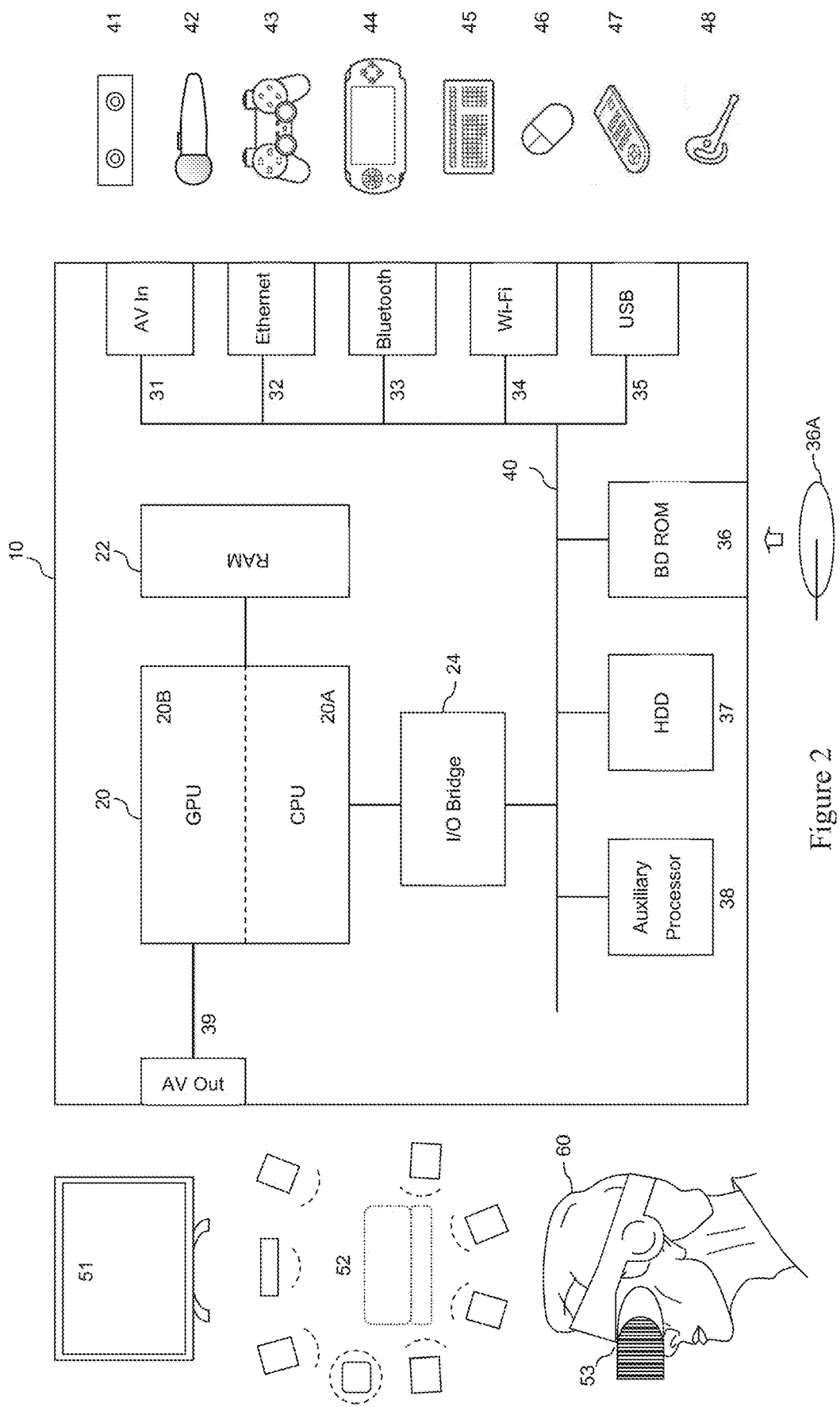
FIG. 2 schematically illustrates an information processing device.

FIG. 2 schematically illustrates the overall system architecture of a Sony® PlayStation 4® entertainment device. A system unit 10 is provided, with various peripheral devices connectable to the system unit. The system unit 10 is an example of the processing devices 1 of FIG. 1.

The system unit 10 comprises an accelerated processing unit (APU) 20 being a single chip that in turn comprises a central processing unit (CPU) 20A and a graphics processing unit (GPU) 20B. The APU 20 has access to a random access memory (RAM) unit 22.

The APU 20 communicates with a bus 40, optionally via an I/O bridge 24, which may be a discreet component or part of the APU 20.

Connected to the bus 40 are data storage components such as a hard disk drive 37, and a Blu-ray® drive 36 operable to access data on compatible optical discs 36A. Additionally the RAM unit 22 may communicate with the bus 40.

Optionally also connected to the bus 40 is an auxiliary processor 38. The auxiliary processor 38 may be provided to run or support the operating system.

The system unit 10 communicates with peripheral devices as appropriate via an audio/visual input port 31, an Ethernet® port 32, a Bluetooth® wireless link 33, a Wi-Fi® wireless link 34, or one or more universal serial bus (USB) ports 35. Audio and video may be output via an AV output 39, such as an HDMI port.

The peripheral devices may include a monoscopic or stereoscopic video camera 41 such as the PlayStation Eye®; wand-style videogame controllers 42 such as the PlayStation Move® and conventional handheld videogame controllers 43 such as the DualShock 4®; portable entertainment devices 44 such as the PlayStation Portable® and PlayStation Vita®; a keyboard 45 and/or a mouse 46; a media controller 47, for example in the form of a remote control; and a headset 48. Other peripheral devices may similarly be considered such as a printer, or a 3D printer (not shown).

The GPU 20B, optionally in conjunction with the CPU 20A, generates video images and audio for output via the AV output 39. Optionally the audio may be generated in conjunction with or instead by an audio processor (not shown).

The video and optionally the audio may be presented to a television 51. Where supported by the television, the video may be stereoscopic. The audio may be presented to a home cinema system 52 in one of a number of formats such as stereo, 5.1 surround sound or 7.1 surround sound. Video and audio may likewise be presented to a head mounted display unit 53 worn by a user 60.

In operation, the entertainment device defaults to an operating system such as a variant of FreeBSD 9.0. The operating system may run on the CPU 20A, the auxiliary processor 38, or a mixture of the two. The operating system provides the user with a graphical user interface such as the PlayStation Dynamic Menu. The menu allows the user to access operating system features and to select games and optionally other content.

Figure 3:
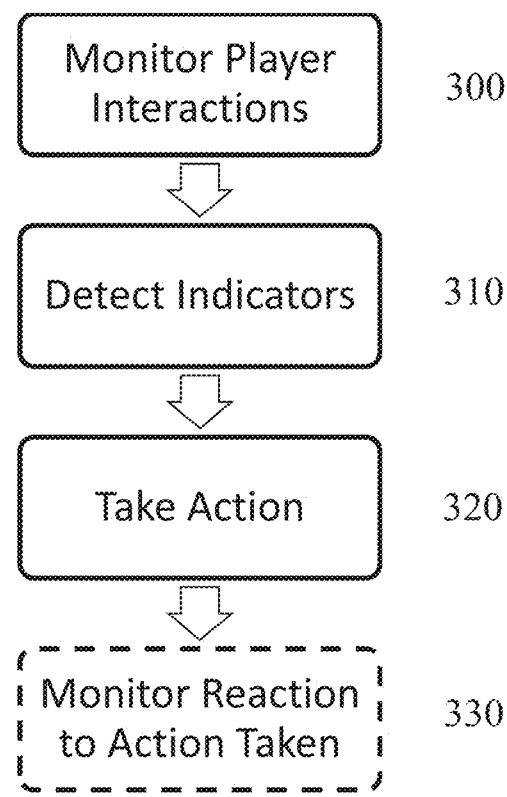
FIG. 3 schematically illustrates a player interaction identification and characterisation method.

FIG. 3 schematically illustrates a player interaction identification method. Such a method may be used to identify a label for the user's interactions and behaviour, such as 'friendly', 'cooperative', 'aggressive', 'rude', or 'toxic', or alternatively may simply be used to identify users that suit a particular one (or more) such descriptions. The user's behaviour could refer to either their interactions with other players (such as voice or text chat), their style of gameplay (such as playing offensively/defensively), or a suitable combination of the two. Of course, rather than using descriptive terms, a user's interactions may be represented by numerical values for one or more different scales.

The below steps outline a general method for implementing a system for identifying player interactions and performing an action in response to the identification. Each of these steps will be described in further detail below, with reference to further figures. While many of the examples given relate to the detection of player interactions and/or behaviour within a game, it should be considered that such methods could be extended to any form of online interaction between users.

A step 300 comprises the monitoring of user interactions, which can be indicative of a general behaviour of the user. This may include the gathering of information about the user's actions, for example, such as chat logs, voice chat files, game score information and/or input history. Of course, the monitoring process may be adapted for the monitoring of different applications; the sources of information indicative of a user's behaviour may be selected freely.

A step 310 comprises detecting indicators of player behaviour, such that player behaviour may be determined from any information gathered from the monitoring step 300. For example, this could include the detection of keywords from a chat log, or in-game events that would be indicative of a certain type of behaviour. Player behaviour may be characterised as 'positive' or 'negative' in some embodiments, while in other embodiments a 'positivity score' that indicates how positively a user has been interacting with other users may be provided. In some embodiments, the user's behaviour is additionally or alternatively characterised with a more specific label that may characterise the interactions more usefully. The more specific labels could relate to the style of interaction, such as noting the giving of advice or the like, such that players may be more precisely characterised.

A step 320 comprises taking action in response to a determination of player behaviour. For example, an overly toxic player could be banned from certain online interactions or services (such as a ban from text chat, or a ban from a particular game altogether) while a more positive player could be rewarded with particular in-game items or a user flair (e.g. a rosette or cup icon) for use on a message board.

A step 330, which may be optional, comprises monitoring the reaction to any action that is taken in the step 320. For example, it could be detected that a user generally has more positive behaviour in response to a particular sanction/reward; this could be used to ensure that an appropriate action is taken in future. This may be advantageous in that it may be more likely that users are reformed in terms of their behaviour, or otherwise encouraged to interact in a particular manner, rather than simply making a new online account and continuing to behave in the same manner.

The method of FIG. 3 may be performed in real-time during the game session, or it may be implemented after the game. The former may be advantageous in that less information needs to be stored after the game (such as chat logs), and that players may be rewarded or sanctioned immediately (for example being promoted in, or kicked from, a game). The latter may be advantageous in that the required processing may be performed during off-peak times on the server, reducing the number of servers that may be required for a particular application. In some embodiments it may be the case that no such processing is performed at all unless a report of a particular type of player behaviour is submitted by players of a game.

Of course, a mixed approach could be used. For example, text chat could be monitored in real-time, while voice chat is analysed after the game. Rather than separating the processing based on the information source, any division may be used. For example, identification of negative player behaviour may be performed in real-time while identification of positive player behaviour may be performed later. This is because the use of sanctions in real-time may be more important than the issuing of rewards, as the sanctions will actively address the problem of toxic behaviour. Again, a mixed approach could be taken here too—text chat could be monitored for negative behaviour only in real-time, for example.

In some embodiments the processing is performed entirely by the server hosting the online interactions, while in other embodiments the processing may be offloaded either entirely or partially to the information processing devices that are being used by the users to take part in those online interactions. If the processing is offloaded, the server may collect the results of the processing, perform any additional processing that may be required, and base any actions to be taken upon the results and/or further processing.

Figure 4:
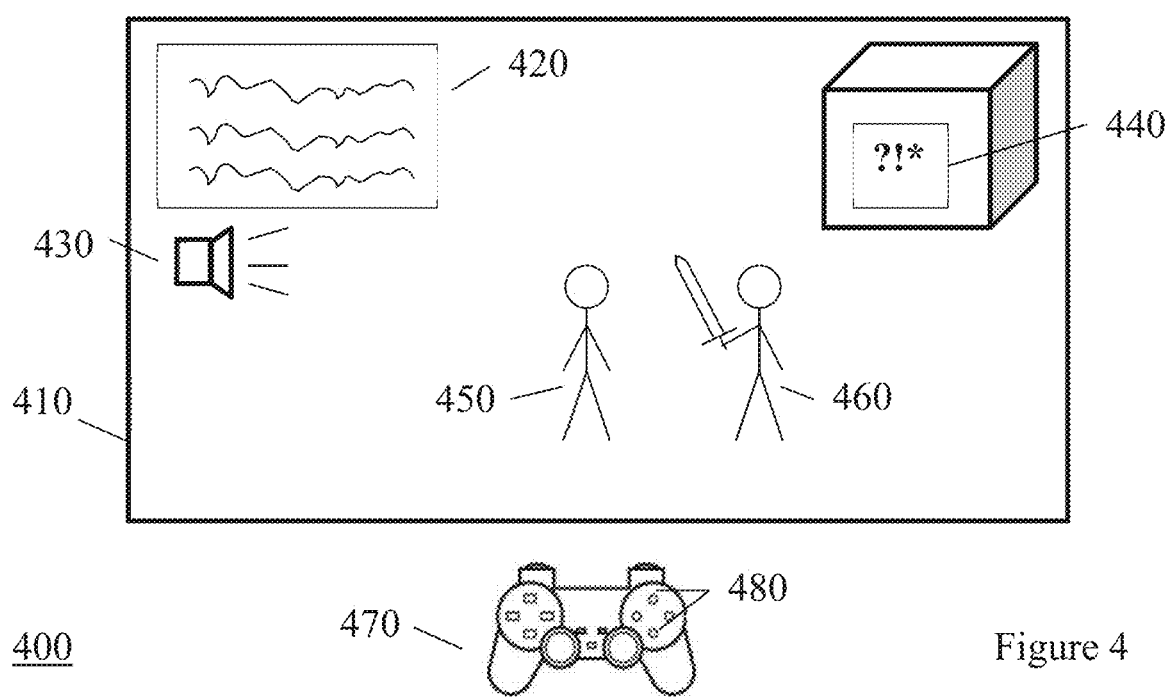
FIG. 4 schematically illustrates a game screen and controller.

FIG. 4 schematically illustrates an exemplary game screen and controller (together represented by the reference 400), and examples of information sources relating to user interactions that may be monitored.

The exemplary game screen 410 shows a scene from a game being played by a user. The screen 410 shows the user's avatar 450 and an avatar 460 controlled by a different player.

A first source of information can be text-based chat interactions, as signified by the text box 420 that may be provided to a user. As noted above, the text chat could be monitored for keywords that would assist in characterising user behaviour; examples would include the use of supportive or encouraging language, or the use of swear words or otherwise insulting terms.

In some games it is considered that text chat which appears innocuous is in fact perceived as being a negative player interaction. For example, the use of a 'quick chat' option (a predefined text snippet that can be sent using a hotkey) that is intended to acknowledge good play (such as 'Nice shot!' or 'What a save!') are instead used when a teammate makes a bad play. It may therefore be appropriate to consider the context in which the chat is used to identify whether or not the interaction is indicative of positive or negative player behaviour. For example, if a player uses the 'What a save!' option immediately after conceding a goal, it may be assumed that this is a negative interaction rather than a positive.

The symbol 430 may be indicative of voice communication being performed, either by the user of the device or by other players in the in-game environment. As discussed above, voice chat may be a source of information that can be used to categorise player behaviour. As with the text chat, this could be based upon the detection of keywords or key phrases.

Alternatively, or in addition, the frequency and/or duration of chat may be used to characterise player behaviour; for example, infrequent but long-lasting communication by a player may be indicative of giving advice to other players.

A further alternative or additional feature may be that of characterising the voice communication in dependence upon an analysis of the voices themselves. For example, the pitch, volume, or the sounds that are used. Each of these may be used to identify speech features that may be indicative of a particular emotion or speech intensity or the like, and it can therefore be possible to derive player behaviour information from this identification.

In these embodiments, the analysis of the chat or voice characteristics may be compared to reference values, rather than considering the absolute values; the reference value may be an average of all communications by users in that game, an average of that user's communications, or any other suitable comparison.

In some games, it is possible for users to interact with the environment in a lasting manner; reference 440 illustrates the application of a sign to a surface in the in-game environment. This may also be an example of an indirect interaction, as once placed it is not clear who may see it and as such it does not directly result in communication with a specific user.

Such a sign 440 may comprise positive or negative images or text, and as such can impact the experience of users who view the sign 440. It can be possible to identify the content of the sign 440 using image recognition or input recording processes, for example.

In order to reduce the burden on an image recognition processor, a user-driven report system could be implemented in some embodiments. Only images that are reported may be considered as potentially offensive or of particular helpfulness, for example.

It is also possible that a user experiences a positive or negative interaction with another player that is not based upon verbal or written communication; of course, negative interactions may be indicative of negative player behaviour of one or more of the parties involved in the interaction.

For example, the player 460 may be exhibiting negative player behaviour by attacking the unarmed player 450. In many games, this may just be a normal part of gameplay and as such cannot be considered as being negative or positive in isolation. In such cases, the attack could be characterised by other sources of information. For instance, game specific information such as the relative levels/strength of the users or characters could be considered, or whether they are in fact on the same team. Alternatively, or in addition, any communication between the players could be monitored—friendly banter between the players would characterise the fighting as being more positive than the use of shouting and/or negative words, for example.

Of course, the image could be interpreted as the character 460 giving the sword to the character 450; the gifting of in-game objects would generally be considered to be indicative of positive player behaviour.

The controller 470 is shown as this may be able to provide information that can be used to characterise player behaviour. For example, when becoming frustrated a player may be more likely to shake the controller 470 violently, or even throw the controller 470, as well as pressing the buttons 480 with a greater force. The handling of the controller 470 in such a manner may be indicative of an interaction with another user being particularly negative (although it could of course be a result of the player's own performance within a game). In response to such handling of the controller 470, analysis of the gameplay and player interactions may be performed to identify the cause of the frustration even when the analysis would not otherwise be performed.

As has been discussed above, the context of the communication may be very important for characterising player interactions. For example, if two users have linked accounts (such as being friends or family members) then a higher threshold may be applied for the determination of negative player behaviour. This is because players who play a game together frequently may frequently provide criticisms of one another in a friendly way, either to be helpful or simply for comic effect. While this could be interpreted by a stranger as being quite offensive, such communications may be acceptable between friends.

Many other sources of context information could be considered to assist in characterising player behaviour. For example, demographic information could be used to identify whether the user belongs to a group that is more generally associated with a particular type of interaction. Information about a user's previous interactions could also be considered; this information could be filtered so as to only relate to interactions with a particular other user, or other users that are similar (for example, in demographic information or gameplay history/current gameplay information) to that particular other user.

Game experience could also be used to characterise the player behaviour. For example, a low-level player may be more likely to engage in negative player interactions in some games—particularly in games in which a user's account may be suspended if they are found to be engaging negatively with other players. Additionally, different communications may have different meanings when coming from different players. For example, when an experienced player gives a new player advice, this is generally seen as positive; when a new player gives an experienced player advice, this may be seen as a more negative (or at least not-so-positive) interaction as it could be considered condescending by the experienced player.

A player's location may also be considered when determining whether the player's behaviour is positive or negative. A user's location may be useful in that it can assist with identifying whether particular interactions would be perceived as being particularly positive or negative in that area—this can assist with accounting for cultural differences between users, for example. In addition, the time of day at which the user is playing could also be identified; this could be used to characterise the interaction (for example, the threshold for identification of negative behaviour could be raised after a 9 pm watershed) or to determine an appropriate action to take in response to such a characterisation.

Conversely, the context of the communication may be derived from the interactions. Users who frequent the same servers and have a particularly friendly or positive set of interactions may be identified as friends, for example.

In the above description, interaction between a pair of players has been considered. Of course, in some games it is possible that a larger number of users are present in a given online environment. In such embodiments it may be more difficult to identify positive or negative interactions; this is because there may be a far greater number of interactions, and users may act positively towards one or more other users but negatively towards others. It may therefore be useful to consider the interactions of a single user with respect to each other person in a group (the group comprising each of the other users in the online environment, or a subset of the users), or the interactions of each member of that group with the single user. By considering interactions in this manner, it may be possible to identify the influence that a particular user is having on the group as a whole; in this way, it may be easier to identify a toxic player, or a player that is being subjected to abuse by the group, for example.

In some embodiments, it is considered advantageous to utilise an artificial intelligence or machine learning implementation in order to be able to characterise player behaviour with a greater accuracy. An example of this is the use of a neural network, although any arrangement that is operable to represent inputs parametrically and identify patterns may be suitable. Such an implementation may be particularly well-suited to identifying patterns in communications and other interactions between users, for example.

Other advantages may also be observed in these embodiments; for example, by using pattern recognition it may be possible to identify markers for particular types of player behaviour that could allow for behaviour to be recognised before it becomes too extreme. For example, toxic interactions could be limited by identifying players who are likely to become toxic in advance of engaging in any particularly negative behaviour and action could be taken to prevent this happening.

Figures 5, 6:
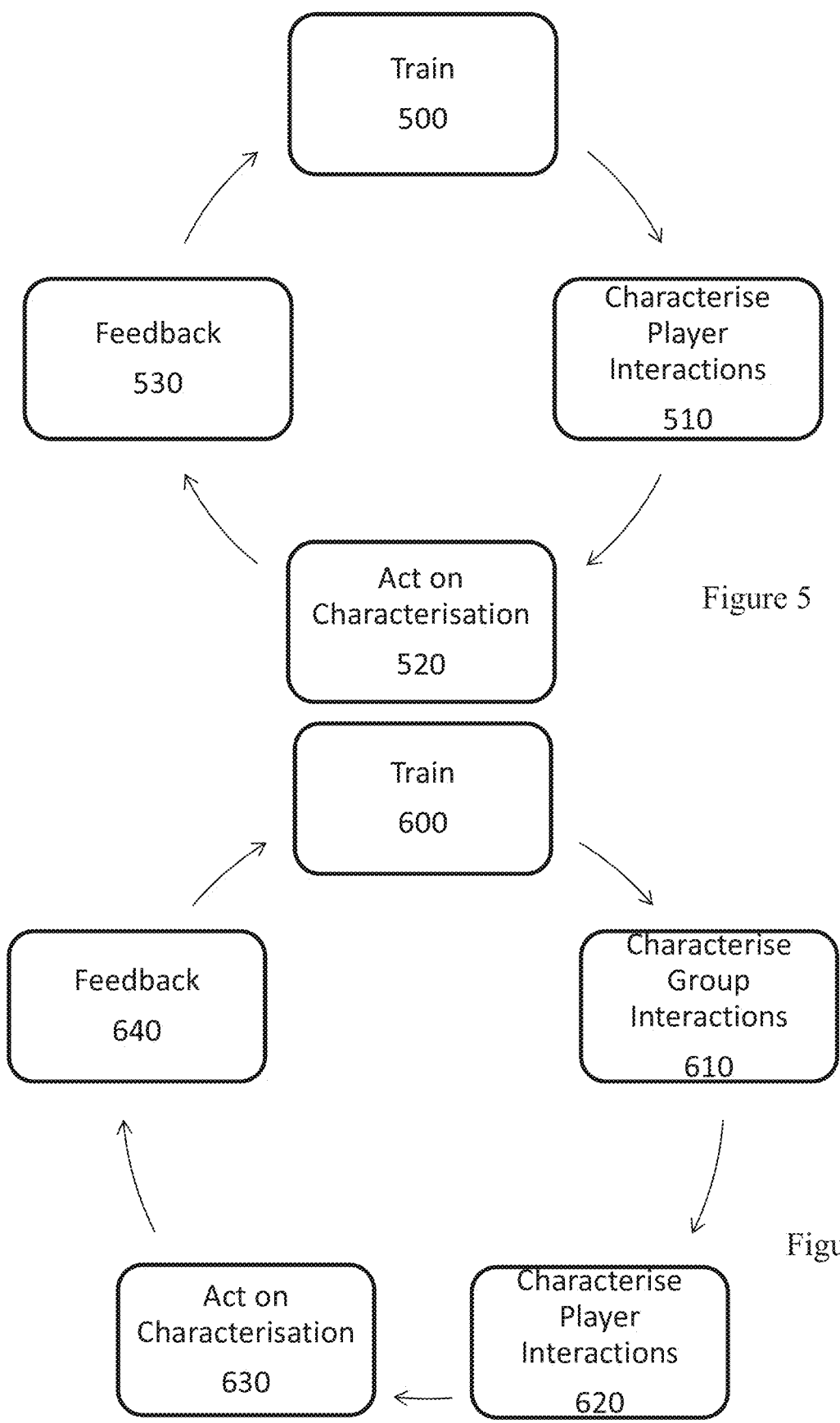
FIG. 5 schematically illustrates a machine-learning-based method for identifying and characterising player interactions.
FIG. 6 schematically illustrates a machine-learning-based method for identifying and characterising group and player interactions.

FIG. 5 schematically illustrates an example of the operation of a machine learning implementation of the player interaction identification and classification method. This method may be implemented entirely by one or more servers, or the processing may be divided between one or more servers and one or more information processing devices associated with users.

At a step 500, training data is provided to the machine learning algorithm. Examples of training data may include any information that is useful for identifying and characterising player interactions and/or behaviour. Lists of key words/phrases may be provided, for example, along with information about which behaviour is characterised by those words and phrases.

Examples of different types of communication or player actions may also be provided with information about the characterisation of the interaction/player behaviour. For example, voice clips or gameplay history could be provided along with information stating whether they are examples of positive/negative/helpful/cooperative interactions/gameplay or the like. This initial characterisation could be performed by a moderator who is supervising machine learning, for example, or it could be sourced from an aggregation of characterisations by a plurality of users.

The training of the algorithm may comprise the use of the input data to identify patterns in behaviour that may be used to characterise observed behaviour.

At a step 510, a characterisation of a player's interactions is performed using newly-obtained information relating to a player's interactions and/or behaviour. This step 510 may be similar to steps 300 and 310 of FIG. 3, for example, in that player behaviour is monitored and any indicators of player behaviour are identified and used to characterise the behaviour of a player.

A step 520 comprises acting on the characterisation of player behaviour that is performed in step 510. This may be similar to the step 320 of FIG. 320, in some embodiments. In some embodiments, optionally a moderator approval of action to be taken is input at this step. For example, rather than automatically banning a toxic player it may be the case that the machine learning algorithm is used to flag severe cases for review by a human.

Reviewers could be employees of the game/service provider, other players (which may require more than one reviewer to pass an action), and/or trusted users such as long-standing members of the community. Of course, the requirement for human review may be omitted, for example in cases in which the action is minor—human review for a 5 minute suspension would likely be considered to be a waste of resources, for example.

At a step 530, feedback may optionally be provided that can act as further training data for the machine learning algorithm. For example, moderator feedback on the accuracy of a characterisation and appropriateness of the action taken in response to the characterisation could be supplied. In some embodiments, the feedback may be generated by users; for example, at the end of a game one or more of the players could be provided with a questionnaire that asks them to identify any players with particular behavioural characteristics. Alternatively, software running on the information processing device that a user is using may automatically compile reports about the interactions within the online environment and submit them to the server; this is an example of a distribution of the processing between servers and information processing devices.

In some embodiments, the feedback could comprise data about a player's future behaviour after the action taken in the step 520. For example, a sanctioned player may be monitored to identify whether their behaviour becomes more or less toxic in response to a sanction. This may be useful in determining suitable sanctions or rewards to be provided to players for differing behaviours.

The feedback may also comprise further training data; in response to a determination of a user's behaviour, information about their interactions may be further analysed so as to be able to refine the model used and/or identify new indicators of a particular type of interaction or behaviour.

Up until now, the characterisation of player behaviour has been discussed in the context of an isolated player or players that interact with other players in a positive or negative manner. However it is common for players of online games to play in groups with their friends, for example by forming a 'party' with which to enter online games. In these cases, interactions between players may become more complex and therefore difficult to characterise. For example, players may be interacting positively with those in their group while interacting in a more negative manner with those outside of the group.

Of course, such groups may form naturally within a game and as such may not be identifiable simply by obtaining party information relating to the players.

The forming of groups in an online environment can be problematic when it comes to player behaviour, as it may embolden certain players to become more toxic in their interactions. In addition to this, it may be the case that one or more of the players in the group encourages other players to act in a more toxic manner, or deliberately acts to elicit a negative response to themselves from other members of the group (so-called 'trolling'); in view of this, it would be advantageous to be able to identify those players that cause the rest of the group to behave in a more negative manner.

Of course, a simple solution to the problem of negative behaviour by members of a group would be to sanction the entire group. This may be seen as rather heavy-handed, however, and as such would likely not be well-received. It may also be perceived as being unfair on members of the group that did not partake in the negative behaviour.

FIG. 6 schematically illustrates a group monitoring method that can be performed by the machine learning algorithm.

A first step 600 comprises training the machine learning algorithm to characterise group behaviour, and to characterise player behaviour within that group. This may be performed in a similar manner to that of the step 500 discussed with reference to FIG. 5, above.

A step 610 comprises characterising group interactions for a group of users. This may be performed by aggregating the characterisation of the behaviour of the individual members of the group, by considering the interactions between the group as a whole with one or more members outside of the group, or any other suitable method. For example, the interaction of the group as a whole with a single user (inside or outside of the group) could be characterised.

A step 620 comprises characterising player interactions. This may be performed similarly to the step 510 of FIG. 5, although the step 620 may comprise further considerations as it may be the case that the player behaviour is characterised in the context of the group's interactions. The player considered in the step 620 may be a part of the group considered in the step 610, or the player may be separate to that group.

A step 630 comprises performing an action in response to characterisation of the group and/or player interactions in steps 610 and 620 respectively. The actions that may be performed are discussed in more detail below.

A step 640 comprises the providing of feedback that may be used to further train the machine learning algorithm. This step may be similar to the step 530 discussed with reference to FIG. 5.

It will be appreciated that the machine learning schemes of FIGS. 5 and 6 may alternatively be implemented using any suitable rule-based method by which individual or group interactions can be characterised based on optionally one or more of text, speech, posted user-content such as images or links, in-game behaviour and the like, and by which an appropriate response can be selected; and that references to these methods herein encompass such alternatives as appropriate.

In some embodiments, the method of FIG. 6 is used to identify targets of bullying of an individual in an online environment by a group. This may be recognised by a characterisation in 610 of members of a group interacting with each other in a friendly way (for example, supportive messages and little shouting or the like), while the interaction of the group's members with a user outside of the group deviates from this—for example, with angry messages and shouting.

In some embodiments, the method of FIG. 6 is used to identify the instigators of trouble within a group; for example, the identification of a toxic player that causes other players in the game to react in a frustrated or angry manner.

While these two scenarios may appear to be similar in many regards, there may be many indications from a player's behaviour that would assist in distinguishing between the two.

For example, a player that is subject to abuse from a group of other players is often more likely to experience a change in their gameplay ability—for instance, they may become demoralised and therefore play worse than before, or become motivated and begin to play better than they were previously playing. This contrasts to the experience of a toxic player, in which they are likely to continue to play at the same standard due to a decreased emotional reaction to the interactions.

A history of interactions between users may also help to distinguish between the different cases; for example, if the first user has not interacted (or not interacted negatively) with the group prior to receiving abuse, then it is likely that it is bullying as they have not done anything to provoke the reaction. Equally, if the user has interacted with the group using words that would be expected to cause a reaction in the users in the group, then it is likely that the user is acting in a toxic manner and creating the negative reaction. The deviation of interactions as mentioned above may be determined with relation to an average or reference value associated with a particular online environment or application, or with respect to the interactions performed by other users in the online environment. For example, a high-intensity game may have a higher threshold for shouting than a more relaxed game, as this would be expected as normal behaviour. Equally, a user who is alone in shouting in an online environment may be more likely to be considered to be acting in a toxic manner than a user who is shouting in an online environment in which multiple other users are shouting.

In this sense, any suitable metric or method for determining the deviation may be used. For example, the average number of decibels in a communication may be measured, the number of capital letters used in text, the frequency of bad language, the number of interactions performed, and/or whether the interactions are targeted at a single user (and/or whether or not the same user is also being targeted by other users). These are examples of the identified deviation relating to a quantifiable difference in one or more characteristics of the monitored interactions.

More general indicators may also be considered, such as a 'mood score' or 'toxicity rating' which may be derived from the previous metrics or any other suitable measures. Such a rating may also be dependent upon an interaction history associated with that user's account or the like, such that users that have a history of toxic behaviour may be more likely to be identified as being toxic.

A threshold could therefore be a predetermined number of decibels of voice communication, for example, a threshold density of capital letter usage relative to lower-case letter usage, or a number of messages sent/received in a particular time frame. Of course, an appropriate threshold may be determined freely for any suitable metric of user behaviour.

Relating this to the two scenarios discussed above, in the first scenario it would be expected that the user's interactions would deviate from those of the group in that they would likely contain less shouting and fewer instances of bad language (for example) than those of the members of the group. In the second scenario, the deviation would more likely become apparent in view of a measurement of an increased amount of inflammatory language relative to the rest of the group, for example.

The deviation may be identified in several ways. For example, interactions between a first user and a group of users may be compared to interactions between a second user and a second group of users. These may be other users within the same online environment, in some embodiments, or they may be users from an earlier set of interactions within the online environment (for example, players from a game played in previous weeks, such as during beta testing of a game).

In some embodiments, the second user and second group of users are part of the first group of users; in this way, comparisons between a user's interaction with those inside the group and those outside of the group may be compared.

In some embodiments, the second user and the second group of users are virtual users that are used to model social interactions in an online environment. For example, models of particular types of users could be generated and used to generate exemplary interactions so as to generate default or reference interactions from which deviations may be compared. For example, interactions between virtual users could be used to generate a set of reference interactions that are representative of expected interactions in the online environment—for example, identifying an expected volume or frequency of communication.

Such modelling may also be advantageous in that simulations may be run that would allow the identity of toxic users to be 'reverse-engineered', as such. For instance, by comparing monitored behaviour to a closest-fit simulation (for example, in terms of number of users, grouping of users, types of interactions, severity of indicators of types of interaction) could allow the instigators of problematic behaviour to be identified using the defined conditions used to generate the simulation.

As noted above, there are a number of actions that may be taken in view of a determination of a player's or group's behaviour. These actions may be selected so as to reward positive interactions or discourage future negative interactions, for example. The actions that are taken may therefore depend on at least the type of behaviour that is identified, a measure of how 'extreme' the behaviour is (such that there can be a difference in actions taken against a slightly toxic player and a very toxic player, for example), and/or whether the user has a history of a particular type of interaction.

In some embodiments, the interactions between users within the group may also be characterised so as to identify those that are the main influencers of the group's behaviour. For example, while the group may act in a particular manner as a whole it may be the actions of an individual that causes this. For instance, a first user may begin acting in a toxic manner and this may cause other players to become irritable and behave negatively, or conversely see this behaviour as acceptable and therefore also begin to act in such a manner. It is also possible that some members of the group do not act in accordance with the rest of the group, of course.

In view of this, it may therefore be inappropriate to sanction or reward players on a per-group basis. Instead, it may be more effective and desirable from a user perspective to identify the influential members of the group and perform actions relating to that user only. For example, while it may be identified that a group is acting in a negative manner as a whole it is possible that the banning of a single member of the group would address the issue sufficiently.

It will be appreciated 'influential' may equally be understood as 'focal', i.e. a person upon whom negative behaviour is focused by other players, either because they have deliberately instigated it as a toxic player or because they are being bullied; in other case the influence the behaviour of the other players, regardless of whether or not it is their fault. As noted above, it may be possible to distinguish between toxic and bullied influential players based on their prior behaviour proceeding negative behaviour from other members of the group and optionally also based on historical behaviour. Clearly it would be undesirable to ban a bullying victim, and so optionally to avoid unwanted consequences of a false positive identification of a toxic player, any influential player associated with negative behaviour in the group could be moved to another instance of the game, thereby removing them from the currently negative situation. Alternatively, when a ban is considered, as noted previously a manual review by moderator may be considered.

In terms of rewarding users for positive interactions with other users, options such as the gifting of in-game items, user profile flairs, in-game or real currency, or access to new features may be considered. This may encourage users to interact in a more positive manner with others. If the rewards are desirable, they may cause a user to consider acting more positively and therefore reduce the likelihood of them acting in a toxic manner. This may have a knock-on effect in that by having more positive interactions the user may be less likely to cause other players to act in a negative manner.

The scope for sanctions for negative behaviour is generally greater, as each of the above rewards could be enacted in a negative way (for example, enforcing the use of bad in-game items, adding a negative flair to a user's profile, causing a user to lose in-game currency or removing access to features/hiding them behind a paywall) in addition to taking new actions.

One example of such an action is to create an 'island' for those who interact negatively. In such an embodiment, users who consistently interact in a negative manner are grouped together such that they are only able to play with other players who interact similarly. While this may result in an extremely negative experience for those users, it removes them from the pool of players that generally interact positively and so can be considered to be a good thing for the user-base as a whole. This may be preferable to an outright ban (which is a further option) as it gives users a chance to reform without losing their progress.

In some examples, a user's ability to interact with other users may be restricted; for example, chat privileges may be revoked or modified so as to disable voice chat or free text entry or the like (or at reduce the allowed frequency of the interactions).

In some embodiments, a tracked behaviour score (indicative of the overall positivity/negativity of interactions) for a user may be used in conjunction with a score indicative of that player's ability in a game when performing matchmaking for a game. This may therefore reduce the likelihood of having one or more toxic players playing a game with more positive players.

It is possible that the gameplay experience for a user is modified in response to a characterisation of their interactions. For example, a user that is becoming increasingly frustrated may have a difficulty level lowered if it is losing that appears to be the cause of frustration. In a multiplayer context, handicaps may be provided to one or more users in order to address any problematic behaviour.

For example, if a player in a game is being constantly harassed or bullied by opponents then they may be provided with a positive boost to their in-game power (a 'buff')—the change in power may be sufficient to discourage the harassment, as it would actively decrease their chances of winning the game.

Similarly, if a player were identified as being toxic and causing a loss of enjoyment for other players then they may be hit with a power loss (a 'nerf'); this acts in a similar manner, in that it causes that player to become more likely to lose a game and therefore can directly reduce their enjoyment of the game.

In some embodiments, it is considered that such a rebalancing of the game is a problem as it can distort competition, and therefore reduce the enjoyment for all of the players in the game.

In view of this, in some embodiments it is considered that a user may be removed from the online environment or relocated within it. For example, a player that is behaving in a toxic manner towards a group may be removed from the game (and replaced by a computer-controlled character or another human player, in some examples) and either not permitted to play for a period of time or simply moved to a new game session with other players. A user that is consistently behaving in a toxic manner is therefore not able to complete a game, and their enjoyment will suffer as a result. It is therefore likely that the user will attempt to behave in a more positive manner.

Of course, if it is determined that it is a group that is behaving in a toxic manner then that group may be removed from the game in a similar manner. However, it may instead be preferable to relocate the target or targets of the negative interactions; the relocated users may be replaced with computer-controlled characters so as to not subject any further users to the behaviour of that group.

Each of these is an example of removing one or more players from a game session or transferring one or more players to another game session.

In some embodiments, the actions taken may take a longer-term approach to reducing toxicity (or promoting more positive interactions). Any suitable method could be implemented here; one example is that of using the characterisation of player interactions/behaviour to suggest new friends or the like (other information could also be used here, such as times when the players are commonly active, skill level, and/or geographical location).

In a similar vein, if patterns are detected in a user's interactions and behaviour then they could be made aware of this via a notification or other communication. For example, a user could be informed that they engage in more negative behaviour when playing with certain players or at certain times of day or the like.

By facilitating the grouping of similarly-behaved (or otherwise complementary) players it may be possible to reduce the occurrence of toxic behaviour. For example, if all players are equally competitive then it is less likely that a player will be singled out as being too casual or too hard-core; players may frequently use the terms 'noob' or 'tryhard' to antagonise other players when there is a mismatch in dedication to the game, for example, which can impact the enjoyment of the game by the targeted player.

As noted above, it is not essential that the disclosed system and method are provided in the context of an online gaming arrangement. For example, in the context of a social media website a group could be identified as one or more users and their friends (or a subset of their friends, such as the ones with which they interact most), and the monitored interactions could include shared images, comments on updates, or direct messages and the like. In response to this, an automatic blocking or reporting of users could be implemented, or the suspending/restriction of a user's account.

Figure 7:
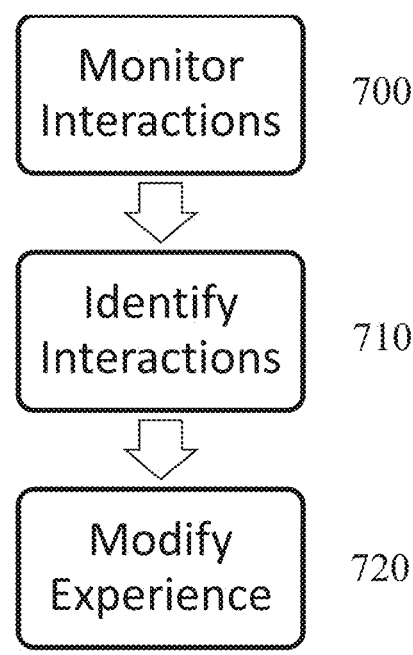
FIG. 7 schematically illustrates a user interaction monitoring method.

FIG. 7 schematically illustrates a user interaction monitoring method for monitoring a user's interactions with other users in an online environment.

A step 700 comprises monitoring interactions between a first user and at least a first group of other users in the online environment and characterising the monitored interactions. The step 700 may be similar to the steps 300, 510 and 610 as discussed with reference to FIGS. 3, 5 and 6 respectively.

The step 700 may comprise monitoring the interactions of individual users and/or groups of users on a per-user or per-group basis. This monitoring can include analysis of communications between users and their in-game actions, for example, as well as obtaining information about interactions in previous sessions or in other online environments.

A step 710 comprises identifying whether interactions between the first user and the first group of other users deviate from the interactions between a second user and a second group of other users in the online environment. The step 710 may be related to steps 610 and 620 of FIG. 6, for example.

The step 710 may therefore include determining an average or reference value for one or more metrics of user behaviour against which to compare a user's or group's interactions. As discussed above, one example of such a metric is that of average decibels of voice communications. The comparison of the behaviour that is monitored in step 700 is then compared against these values to determine whether or not the monitored behaviour is similar to that which is expected for that online environment or whether it deviates from the expected behaviour by a threshold amount.

A step 720 comprises modifying the user experience in the online environment for the first user if it is identified that there is a deviation in the interactions. The step 720 may be similar to the steps 320, 520 and 630 as discussed with reference to FIGS. 3, 5 and 6 respectively.

The step 720 may therefore comprise a determination of the magnitude of the deviation of the interactions from the expected values, and the nature of the deviation so as to identify a particular behaviour. Based upon this determination, an appropriate action to be taken may be taken to modify the user experience of the first user; examples of this include moving that user to a different part of the online environment (such as a new game lobby) or removing players from the first group from the online environment in which the first user is present.

Figure 8:
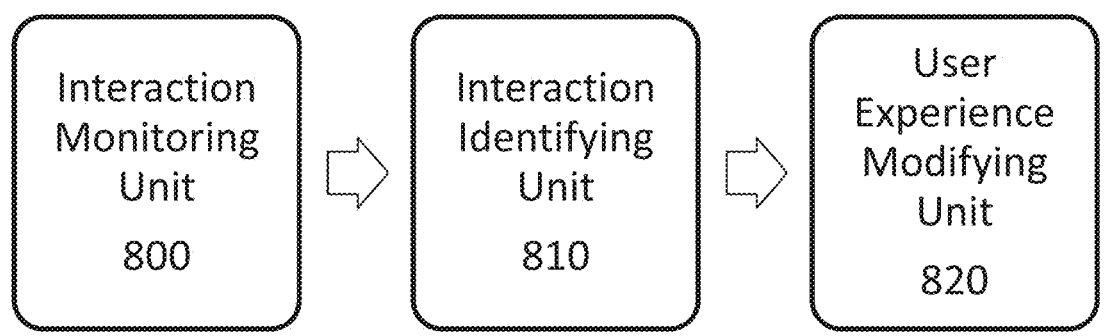
FIG. 8 schematically illustrates a user interaction monitoring system.

FIG. 8 schematically illustrates a user interaction monitoring system for monitoring a user's interactions with other users in an online environment. This system comprises an interaction monitoring unit 800, an interaction identifying unit 810 and a user experience modifying unit 820.

The interaction monitoring unit 800 is operable to monitor interactions between a first user and at least a first group of other users in the online environment and characterising the monitored interactions. For example, the interaction monitoring unit 800 may be configured to perform the processing associated with step 700 of FIG. 7.

The monitored interactions may comprise one or more of text, image and voice communication, for example, or any of the other interactions discussed above.

The interaction identifying unit 810 is operable to identify whether interactions between the first user and the first group of other users deviate from the interactions between a second user and a second group of other users in the online environment. For example, the interaction identifying unit 810 may be configured to perform the processing associated with step 710 of FIG. 7. The interaction identifying unit 810 may be specifically operable to identify a toxic user based upon the monitored interactions, in some embodiments.

The user experience modifying unit 820 is operable to modify the user experience in the online environment for the first user if it is identified that there is a deviation in the interactions. For example, the user experience modifying unit 820 may be configured to perform the processing associated with step 720 of FIG. 7.

In some embodiments, the user experience modifying unit is operable to remove one or more users from the game session and/or, if other game sessions are available, transfer one or more users to another game session within the online environment. Alternatively, or in addition, the user experience modifying unit may be operable to modify one or more of a user's profile attributes or the attributes of a game character associated with the user.

In some embodiments, the interaction monitoring unit 800 is also operable to monitor interactions between one or more users in the first group of users, and the interaction identifying unit 810 is also operable to identify whether interactions between the first user and the first group of other users deviate from the interactions between users within the first group of other users. This can be advantageous in that no historical/simulated reference data is required to identify deviations in user interactions in an online environment; it can also be possible to identify if particular users within the group are driving the interactions of that group.

For example, the interaction identifying unit 810 may be operable to identify influential users within the first group of users, while the user experience modifying unit 820 may be operable to modify the user experience in the online environment for one or more users in response to an identification of influential users. This may target the action to be taken towards those users in the group that drive the group's behaviour, as discussed above.

It will be appreciated that embodiments of the present invention may be implemented in hardware, programmable hardware, software-controlled data processing arrangements or combinations of these. It will also be appreciated that computer software or firmware used in such embodiments, and providing media for providing such software or firmware (such as storage media, for example a machine-readable non-transitory storage medium such as a magnetic or optical disc or a flash memory) are considered to represent embodiments of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A user interaction monitoring system for monitoring a user's interactions with other users in an online environment, the system comprising:
    an interaction monitoring unit operable to contemporaneously monitor interactions between a first user and at least a first group of other users in the online environment and contemporaneously characterising the monitored interactions;
    an interaction identifying unit operable to identify whether interactions between the first user and the first group of other users deviate from the interactions between a second user and a second group of other users in the online environment; and
    a user experience modifying unit operable to contemporaneously modify the user experience in the online environment for the first user with at least the first group of other users when it is identified that there is a deviation in the interactions,
    wherein the interaction identifying unit is operable to contemporaneously identify a toxic user from the iteractions,
    wherein the online environment comprises one or more game sessions, and
    wherein the user experience modifying unit is operable to, based on the identification of one or more toxic users, remove the one or more users from the game session and/or, if other game sessions are available, and transfer the one or more toxic users to another game session among the one or more game sessions.

2. A system according to claim 1, wherein the monitored interactions comprise one or more of text, image and voice communication.

3. A system according to claim 1, wherein the second user and the second group of other users each belong to the first group of other users.

4. A system according to claim 1, wherein the second user and the second group of other users are virtual users, and the interactions between them are representative of expected interactions in the online environment.

5. A system according to claim 1, wherein:
the interaction monitoring unit is also operable to monitor interactions between one or more users in the first group of users; and
the interaction identifying unit is also operable to identify whether interactions between the first user and the first group of other users deviate from the interactions between users within the first group of other users.

6. A system according to claim 5, wherein:
the interaction identifying unit is operable to identify influential users within the first group of users; and
the user experience modifying unit is operable to modify the user experience in the online environment for one or more users in response to an identification of influential users.

7. A system according to claim 1, wherein the user experience modifying unit is operable to modify one or more of a user's profile attributes or the attributes of a game character associated with the user.

8. A system according to claim 1, wherein the interaction monitoring unit, interaction identifying unit and user experience modifying unit each perform at least a portion of the processing of a machine learning algorithm that is used to monitor and identify user interactions.

9. A system according to claim 1, wherein the identified deviation relates to a quantifiable difference in one or more characteristics of the monitored interactions.

10. A user interaction monitoring method for monitoring a user's interactions with other users in an online environment, the method comprising:
contemporaneously monitoring interactions between a first user and at least a first group of other users in the online environment and contemporaneously characterising the monitored interactions;
contemporaneously identifying whether interactions between the first user and the first group of other users deviate from the interactions between a second user and a second group of other users in the online environment; and
contemporaneously modifying the user experience in the online environment for the first user with at least the first group of other users when it is identified that there is a deviation in the interactions,
wherein the identifying includes contemporaneously identifying a toxic user from the interactions,
wherein the online environment comprises one or more game sessions, and
wherein the user experience modifying unit is operable to, based on the identification of one or more toxic users, remove the one or more users from the game session and/or, if other game sessions are available, and transfer the one or more toxic users to another game session among the one or more game sessions.

11. A non-transitory computer-readable storage medium which stores computer software, which when executed by a computer, causes the computer to carry out actions, comprising:
contemporaneously monitoring interactions between a first user and at least a first group of other users in the online environment and contemporaneously characterising the monitored interactions;
contemporaneously identifying whether interactions between the first user and the first group of other users deviate from the interactions between a second user and a second group of other users in the online environment; and
contemporaneously modifying the user experience in the online environment for the first user with at least the first group of other users when it is identified that there is a deviation in the interactions,
wherein the identifying includes contemporaneously identifying a toxic user from the interactions,
wherein the online environment comprises one or more game sessions, and
wherein the user experience modifying unit is operable to, based on the identification of one or more toxic users, remove the one or more users from the game session and/or, if other game sessions are available, and transfer the one or more toxic users to another game session among the one or more game sessions.

* * * * *